Patented Aug. 11, 1953

2,648,702

UNITED STATES PATENT OFFICE 2,648,702

2,2,3,3,-TETRAHALO-1,4-BUTANEDIOL-DIBENZOATES

Oliver De Garmo, St. Louis, and Ferdinand B. Zienty, Brentwood, Mo., assignors to Monsanto Chemical Company, St. Louis, Mo., a corporation of Delaware No Drawing. Application September 28, 1951,
Serial No. 248,882

14 Claims. (Cl. 260—476)

This invention relates to 2,2,3,3-tetrahalo-1,4-butanediol-dibenzoates. More specifically, this invention relates to 2,2,3,3-tetrahalo-1,4-butanediol-dibenzoates having the formula

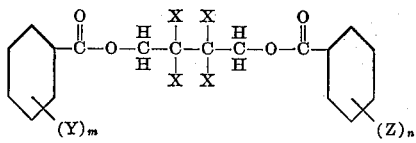

wherein X, Y and Z represent a halogen atom and $m$ and $n$ represent an integer from 0 to 5 inclusive. These compounds are useful as herbicides, fungicides and insecticides.

The novel compounds of this invention may be prepared by halogenating a 2-butyne-1,4-diol-dibenzoate having the formula

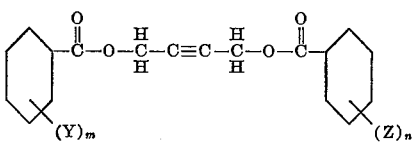

wherein Y and Z represent a halogen atom and $m$ and $n$ are integers from 0 to 5 inclusive. 2-butyne-1,4-diol-dibenzoates are conveniently prepared by esterifying 2-butyne-1,4-diol with benzoyl halides. The following examples are illustrative, but not limitative, of the novel compounds of this invention:

Example I 14.2 g. of 2-butyne-1,4-diol-dibenzoate is dissolved in 250 ml. of carbon tetrachloride. The mixture is cooled to 5° C. and chlorine passed into this solution at 5° C. until chlorine absorption ceases. The carbon tetrachloride is distilled from the reaction mixture under reduced pressure and the crude 2,2,3,3-tetrachloro-1,4-butanediol-dibenzoate recovered and purified by recrystallization from acetone.

2,2,3,3 - tetrachloro - 1,4 - butanediol - dibenzoate thus obtained has a melting point of 130°–133° C. The product has the following analysis:

|  | Cl |
|---|---|
| Calculated for $C_{18}H_{14}Cl_4O_4$_____per cent__ | 32.60 |
| Found _____do____ | 32.24 |

Example II

In accordance with the procedure described in Example I, chlorine is passed into a carbon tetrachloride solution of 2-butyne-1,4-diol-bis-(4-bromobenzoate) at a temperature of approximately 5° C. Chlorination is continued until chlorine absorption ceases. The carbon tetrachloride is distilled from the reaction mixture under reduced pressure and an excellent yield of 2,2,3,3 - tetrachloro - 1,4 - butanediol - bis(4-bromobenzoate) recovered and purified by recrystallization from acetone.

Example III

In accordance with the procedure described in Example I, 15.0 g. of 2-butyne-1,4-diol-bis(dichlorobenzoate) is dissolved in 200 ml. of carbon tetrachloride. The dichlorobenzoic acid used in the preparation of 2-butyne-1,4-diol-bis(dichlorobenzoate) is obtained by the chlorination of benzoic acid. The mixture is cooled to 5° C. and chlorine passed into this solution at 5° C. until chlorine absorption ceases. The carbon tetrachloride is distilled from the reaction mixture under reduced pressure and the crude 2,2,3,3-tetrachloro - 1,4 - butanediol - bis(dichlorobenzoate) recovered and purified by recrystallization from acetone. The product has a melting point of 130–144° C.

|  | Cl |
|---|---|
| Calculated for $C_{18}H_{10}O_4Cl_8$_____per cent__ | 49.42 |
| Found _____do____ | 49.85 |

Example IV

In accordance with the procedure described in Example I, 18.3 g. of 2-butyne-1,4-diol-bis-(dibromobenzoate) is dissolved in 250 ml. of carbon tetrachloride. The mixture is cooled to 5° C. and chlorine passed into this solution at 5° C. until chlorine absorption ceases. The carbon tetrachloride is distilled from the reaction mixture under reduced pressure and the crude 2,2,3,3-tetrachloro - 1,4 - butanediol - bis(dibromobenzoate) recovered and purified by recrystallization from acetone.

Example V

In accordance with the procedure described in Example I, 15.9 g. of 2-butyne-1,4-diol-bis(diiodobenzoate) is dissolved in 200 ml. of carbon tetrachloride. The mixture is cooled to 5° C. and chlorine passed into this solution at 5° C. until chlorine absorption ceases. The carbon tetrachloride is distilled from the reaction mixture under reduced pressure and the crude 2,2,3,3-tetrachloro-1,4-butanediol-bis(diiodobenzoate) recovered and purified by recrystallization from acetone.

Example VI

In accordance with the procedure described in Example I, bromine is passed into a carbon tetrachloride solution of 2-butyne-1,4-diol-bis(2,4,5- trichlorobenzoate) at a temperature of approximately 5° C. Bromination is continued until bromine absorption ceases. The carbon tetrachloride is distilled from the reaction mixture under reduced pressure and an excellent yield of 2,2,3,3-tetrabromo-1,4-butanediol - bis(2,4,5 - trichlorobenzoate) recovered and purified by recrystallization from acetone.

Example VII

Chlorine is passed into a carbon tetrachloride solution of 1-(2,4 - dibromobenzoxy) - 4-(2,4-dichlorobenzoxy)-2-butyne at a temperature of approximately 5° C. Chlorination is continued until chlorine absorption ceases. The carbon tetrachloride is distilled from the reaction mixture under reduced pressure and an excellent yield of crude 1-(2,4-dibromobenzoxy)-4-(2,4-dichlorobenzoxy) - 2,2,3,3 - tetrachloro - butane recovered and purified by recrystallization from acetone.

Example VIII

In accordance with the procedure described in Example I, chlorine is passed into a carbon tetrachloride solution of 2-butyne-1,4-diol-bis(4-chlorobenzoate) at a temperature of approximately 5° C. Chlorination is continued until chlorine absorption ceases. The carbon tetrachloride is distilled from the reaction mixture under reduced pressure and an excellent yield of 2,2,3,3-tetrachloro-1,4 - butanediol-bis(4-chlorobenzoate) recovered and purified by recrystallization from acetone.

While the preceding examples have illustrated specific embodiments of this invention, it will be obvious to those skilled in the art that the reactants and reaction conditions specified in these examples are subject to substantial variation without departing from the scope of this invention. For example, the benzoate groups in the 2-butyne-1,4-diol-dibenzoates which are halogenated in accordance with the procedures set forth in the preceding examples may be unsubstituted or mono, di, tri, tetra or penta substituted with any of the halogen atoms such as chlorine, bromine, iodine or fluorine. When a plurality of halogen atoms are present in the benzoate groups, either singly or combined, the halogen atoms may be similar or dissimilar.

The halogenation reaction may be carried out according to any method of halogenation well known to those skilled in the art. Preferably, it is carried out in the presence of an inert solvent, such as carbon tetrachloride, chloroform, tetrachlorethane, etc. The temperature of reaction may be varied over a substantial range, such as from about 0° C. to about 50° C. Preferably, it is carried out at a temperature in the range of from about 0° C. to about 10° C.

After the halogenation reaction is complete, the 2,2,3,3-tetrahalo-1,4-butanediol-dibenzoates may be recovered from the reaction mixture by any convenient method and further purified, if desired, by recrystallization from a suitable solvent.

What is claimed is:

1. As new chemical compounds, 2,2,3,3-tetrahalo-1,4-butanediol-dibenzoates having the formula

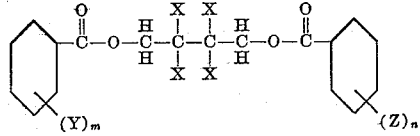

wherein X is a member of the group consisting of chlorine and bromine, wherein Y and Z are members of the group consisting of chlorine, bromine and iodine and wherein $m$ and $n$ represent an integer from 0 to 5 inclusive.

2. As new chemical compounds, 2,2,3,3-tetrahalo-1,4-butanediol-dibenzoates having the formula

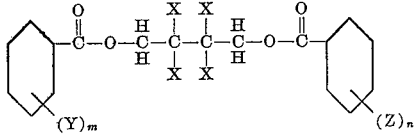

wherein X, Y and Z represent the chlorine atom and $m$ and $n$ represent an integer from 0 to 5 inclusive.

3. 2,2,3,3-tetrachloro - 1,4 - butanediol - dibenzoate.

4. 2,2,3,3-tetrachloro - 1,4 - butanediol-bis(dichlorobenzoate).

5. 2,2,3,3 - tetrachloro - 1,4-butanediol - bis(4-bromobenzoate).

6. 2,2,3,3 - tetrabromo - 1,4 - butanediol - bis (2,4,5-trichlorobenzoate).

7. 2,2,3,3 - tetrachloro - 1,4 - butanediol - bis-(4-chlorobenzoate).

8. A process for the preparation of 2,2,3,3-tetrahalo-1,4-butanediol-dibenzoates having the formula

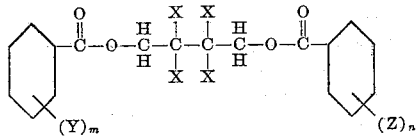

wherein X is a member of the group consisting of chlorine and bromine, wherein Y and Z are members of the group consisting of chlorine, bromine and iodine and wherein $m$ and $n$ represent an integer from 0 to 5 inclusive, which comprises halogenating with a member of the group consisting of chlorine and bromine, a 2-butyne-1,4-diol-dibenzoate having the formula

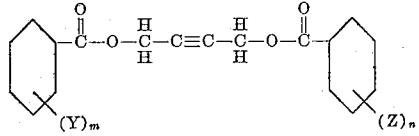

wherein Y and Z represent a halogen selected from the group consisting of chlorine, bromine and iodine and wherein $m$ and $n$ are integers from 0 to 5 inclusive.

9. A process for the preparation of 2,2,3,3-tetrahalo-1,4-butanediol-dibenzoates having the formula

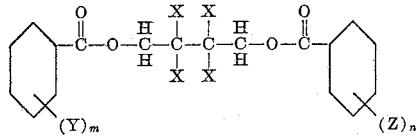

wherein X, Y and Z represent the chlorine atom and $m$ and $n$ represent an integer from 0 to 5 inclusive, which comprises chlorinating a 2-butyne-1,4-diol-dibenzoate having the formula

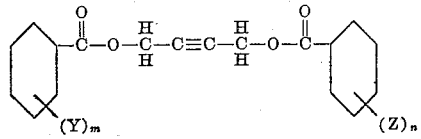

wherein Y and Z represent the chlorine atom and $m$ and $n$ are integers from 0 to 5 inclusive.

10. A process for the preparation of 2,2,3,3-tetrachloro-1,4-butanediol-dibenzoate which comprises chlorinating 2-butyne-1,4-diol-dibenzoate.

11. A process for the preparation of 2,2,3,3-tetrachloro-1,4-butanediol-bis(dichlorobenzoate) which comprises chlorinating 2-butyne-1,4-diol-bis(dichlorobenzoate).

12. A process for the preparation of 2,2,3,3-tetrachloro-1,4-butanediol-bis(4-bromobenzoate) which comprises chlorinating 2-butyne-1,4-diol-bis(4-bromobenzoate).

13. A process for the preparation of 2,2,3,3-tetrabromo-1,4-butanediol-bis(2,4,5-trichlorobenzoate) which comprises brominating 2-butyne-1,4-diol-bis(2,4,5-trichlorobenzoate).

14. A process for the preparation of 2,2,3,3-tetrachloro-1,4-butanediol-bis(4-chlorobenzoate) which comprises chlorinating 2-butyne-1,4-diol-bis(4-chlorobenzoate).

OLIVER DE GARMO.
FERDINAND B. ZIENTY.

No references cited.